US012806987B2

(12) United States Patent
Nishiki

(10) Patent No.: US 12,806,987 B2
(45) Date of Patent: Nov. 24, 2026

(54) HYBRID VEHICLE

(71) Applicant: TOYOTA JIDOSHA KABUSHIKI KAISHA, Toyota (JP)

(72) Inventor: Nobuyasu Nishiki, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 19/032,533

(22) Filed: Jan. 21, 2025

(65) Prior Publication Data

US 2025/0242682 A1 Jul. 31, 2025

(30) Foreign Application Priority Data

Jan. 25, 2024 (JP) ................................ 2024-009748

(51) Int. Cl.

*B60K 6/40* (2007.10)
*B60K 6/28* (2007.10)
*B60K 13/04* (2006.01)
*B60R 13/08* (2006.01)
*B62D 21/15* (2006.01)

(52) U.S. Cl.

CPC .................. *B60K 6/40* (2013.01); *B60K 6/28* (2013.01); *B60K 13/04* (2013.01); *B60R 13/0876* (2013.01); *B62D 21/157* (2013.01); *B60Y 2200/92* (2013.01); *B60Y 2400/112* (2013.01)

(58) Field of Classification Search

CPC ... B60K 6/26; B60K 6/28; B60K 6/40; B60K 6/46; B60K 2006/266; B60K 2006/268; B60L 7/02; B60L 7/10; B60L 50/13; B60L 50/15; B60L 50/61; B60L 58/12; B60L 2200/36; B60L 2200/40; B60L 2210/40; B60L 2220/42

See application file for complete search history.

(56) References Cited

U.S. PATENT DOCUMENTS

2018/0072352 A1* 3/2018 Shimoda .................. B60K 6/28

FOREIGN PATENT DOCUMENTS

JP 2001115835 A * 4/2001 ............. B60K 13/04
JP 2020023258 A * 2/2020 ............. B60K 13/04
JP 2020-059359 A 4/2020

* cited by examiner

*Primary Examiner* — Tinh T Dang
(74) *Attorney, Agent, or Firm* — Dinsmore & Shohl LLP

(57) ABSTRACT

A hybrid vehicle includes: an internal combustion engine, an electric motor, a battery pack, an exhaust pipe having a bent portion, and a protection member. Further, the protection member includes a first portion joined to a side wall portion of a lower case, a second portion joined to a lower case, and a third portion, extending from the first portion to the second portion, separated from the side wall portion to create a space from the side wall portion, and the third portion has a curved shape bulging to a side of the exhaust pipe than a side of the side wall portion in the horizontal direction, and is formed in a manner that a distance from the side wall portion in the horizontal direction becomes smaller as a position of the third portion is downward from the first portion to the second portion in a vertical direction.

5 Claims, 3 Drawing Sheets

HYBRID VEHICLE

CROSS-REFERENCE TO RELATED APPLICATION(S)

The present application claims priority to and incorporates by reference the entire contents of Japanese Patent Application No. 2024-009748 filed in Japan on Jan. 25, 2024.

BACKGROUND

The present disclosure relates to a hybrid vehicle.

In Japanese Laid-open Patent Publication No. 2020-059359, in the hybrid vehicle battery pack is disposed below the floor panel of the vehicle body, in order to suppress the heat transfer from the exhaust pipe to the battery pack, the insulator and the bracket and the reinforcing member is disposed between the exhaust pipe and the battery pack it is disclosed. In the configuration described in Japanese Laid-open Patent Publication No. 2020-059359, it is possible to reinforce the rigidity of the battery pack by the reinforcing member attached to the bracket.

SUMMARY

There is a need for providing a hybrid vehicle capable of suppressing an external load from being input to a battery cell of a battery pack.

According to an embodiment, A hybrid vehicle includes: an internal combustion engine disposed in a front portion of a vehicle body, an electric motor disposed in a front portion of the vehicle body, a battery pack, disposed below a floor panel of the vehicle body, for supplying power to the electric motor, and an exhaust pipe extending from the internal combustion engine to a rear side of the vehicle body and having a bent portion that bends along a side surface of the battery pack in a lower portion of the floor panel. Further, the battery pack includes a battery stack in which a plurality of battery cells are stacked, and an upper cover and a lower case for accommodating the battery stack, the lower case is fixed to the vehicle body through a support member, the hybrid vehicle further comprising a protection member, arranged between the bent portion of the exhaust pipe and a side wall portion of the lower case adjacent in a horizontal direction, for protecting the lower case against a load input from outside, the side wall portion is disposed in a vicinity of the bent portion of the exhaust pipe in the horizontal direction and formed along the bent portion, and, when viewed from above the lower case, and is extending toward outward in a vehicle width direction outward as the side wall portion extends toward the rear side of the vehicle body, the protection member includes a first portion joined to the side wall portion of the lower case, a second portion joined to a bottom of the lower case, and a third portion, extending from the first portion to the second portion, separated from the side wall portion so as to create a space from the side wall portion, and the third portion has a curved shape bulging to a side of the exhaust pipe than a side of the side wall portion in the horizontal direction, and is formed in a manner that a distance from the side wall portion in the horizontal direction becomes smaller as a position of the third portion is downward from the first portion to the second portion in a vertical direction.

DETAILED DESCRIPTION

In the prior art, in the hybrid vehicle in which the battery pack is disposed below the floor panel, it may not be possible to place the bracket or reinforcing member between the battery pack and the exhaust pipe due to mounting restrictions. In this case, there is room for improvement in reducing the input load to the battery cell by reducing the load input to the battery pack from the outside.

Hereinafter, a hybrid vehicle in the embodiment of the present disclosure will be specifically described. Note that the present disclosure is not limited to the embodiments described below.

Figure 1:
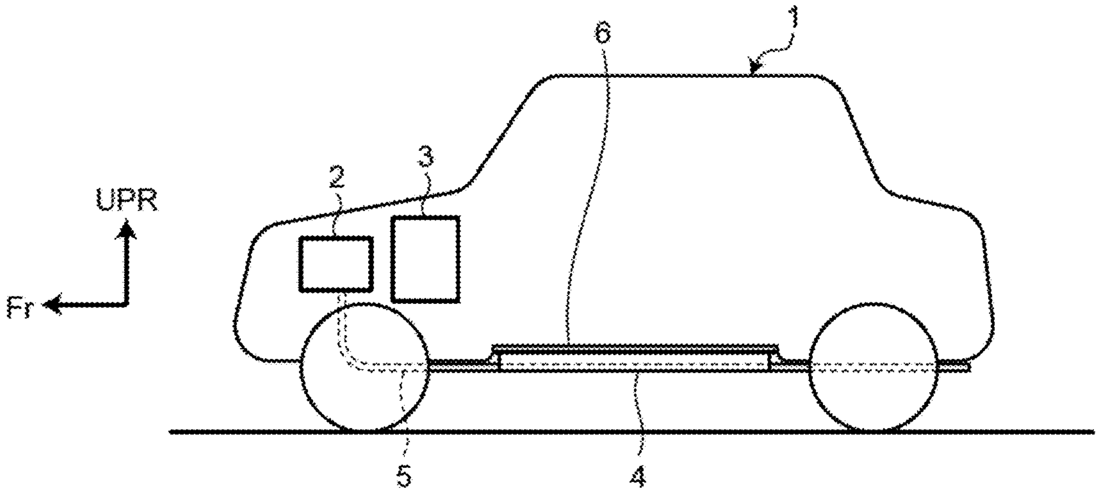
FIG. 1 is a diagram schematically illustrating a hybrid vehicle according to an embodiment.

FIG. 1 is a diagram schematically illustrating a hybrid vehicle in the embodiment. The hybrid vehicle 1 is a plug-in hybrid vehicle (PHEV) that can charge the power supplied from an external power source. The hybrid vehicle 1 includes an engine 2, a motor 3, a battery pack 4, and an exhaust pipe 5.

The engine 2 is an internal combustion engine located at the front of the car body. The engine 2 is mounted in the engine compartment. The engine compartment is provided at the front of the body of the hybrid vehicle 1. Power output from the engine 2 is transmitted to the wheels through the power transmission device.

The motor 3 is a motor generator which is located at the front of the car body and functions as an electric motor and generator. The motor 3 is mounted in the engine compartment. The motor 3 is driven by power supplied from the battery pack 4. The power output from the motor 3 is transmitted to the wheels through the power transmission device.

The battery pack 4 is disposed below the floor panel 6 of the vehicle body. The battery pack 4 is disposed on the rear side of the vehicle body than the motor 3, and supplies power to the motor 3. The battery pack 4 is electrically connected to the motor 3 via an inverter. The inverter is mounted in the engine compartment.

The exhaust pipe 5 extends from the engine 2 to the rear side of the vehicle body, to flow the exhaust discharged from the engine 2. The exhaust pipe 5 extends in the vehicle longitudinal direction so as to be adjacent to the battery pack 4 below the floor panel 6.

Figure 2:
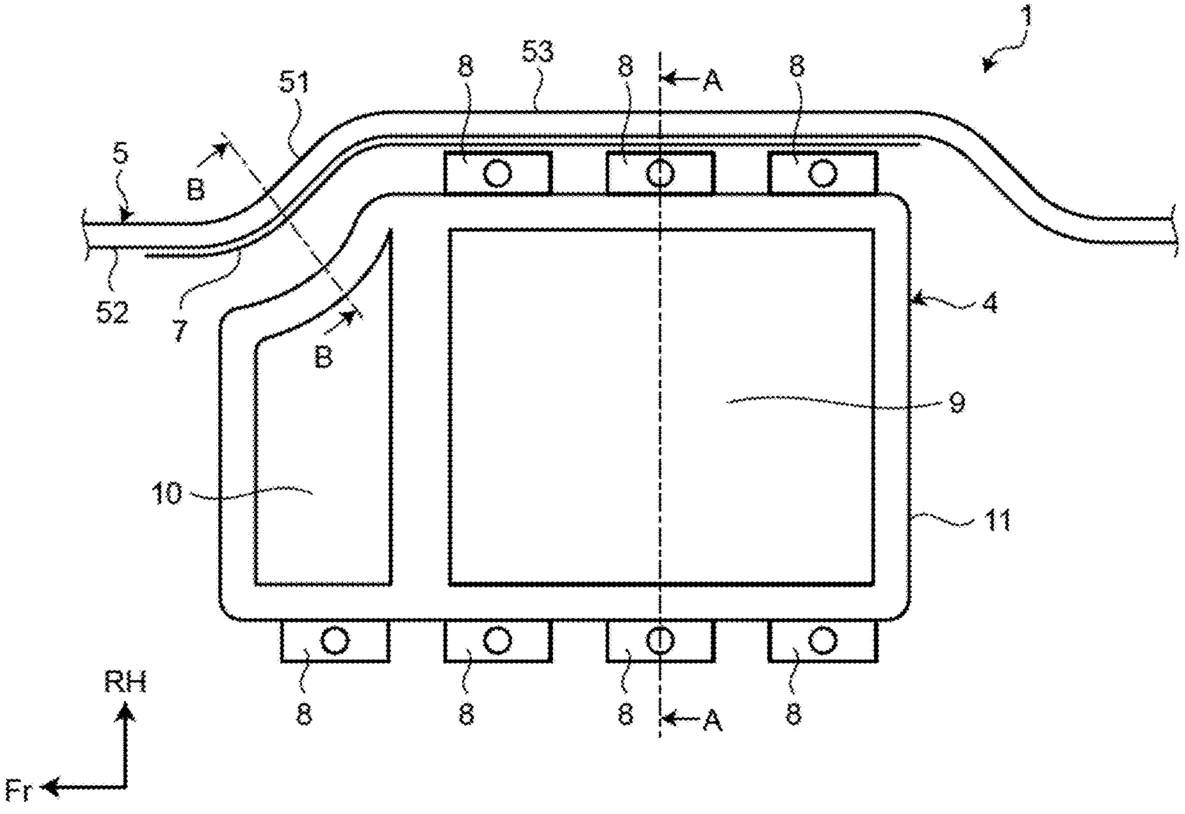
FIG. 2 is a diagram for explaining the arrangement of the exhaust pipe and the battery pack when viewed hybrid vehicle from above.

As illustrated in FIG. 2, below the floor panel 6, the exhaust pipe 5 extends in the vehicle longitudinal direction so as to bypass the battery pack 4. The exhaust pipe 5 has a bent portion 51 that bends along the side surface of the battery pack 4. The bent portion 51 is a portion inclined with respect to the vehicle front-rear direction, and extends outward in the vehicle width direction as the front side toward the rear side of the vehicle body. The exhaust pipe 5 has an upstream portion 52 of the upstream side of the bent portion 51, and a downstream portion 53 of the downstream side of the bent portion 51. The upstream portion 52 is disposed in front of the battery pack 4 and extends along the vehicle front-rear direction. The downstream portion 53 is disposed on the side of the battery pack 4 and extends along the vehicle front-rear direction.

The hybrid vehicle 1 includes an insulator 7. The insulator 7 is a heat shield member. The insulator 7 is provided between the exhaust pipe 5 and the battery pack 4, to suppress the heat of the exhaust pipe 5 is transferred to the battery pack 4. The insulator 7 is disposed so as to include a range in which the battery pack 4 is disposed in the vehicle longitudinal direction.

The hybrid vehicle 1 includes a bracket 8. The bracket 8 is a support member for fixing the battery pack 4 to the vehicle body. The battery pack 4 is fixed to the vehicle body via the bracket 8. The bracket 8 is provided on the outside of the battery pack 4.

The battery pack 4 includes a battery stack 9, electrical equipment 10, and a case 11.

The battery stack 9 is a battery pack in which a plurality of battery cells 91 are stacked. The case 11 houses the battery stack 9 and the electrical equipment 10. Inside the case 11, the electric device 10 is disposed in front of the battery stack 9. The electric device 10 is electrically connected to the battery stack 9 and is electrically connected to the inverter.

The hybrid vehicle 1 includes a connector block provided at a front portion of the case 11, and a connector protective plate for protecting the front portion and the connector block of the battery pack 4. The block for connector is a block through which the wire harness penetrates. The electrical equipment 10 is electrically connected to the inverter via a wire harness passing through the connector block. A connector protection plate is a member to protect a connector connected to the connector block and a wire harness extending from the connector block to the front side of the vehicle body from load input from the road surface. The connector protection plate is attached to the case bottom at the front side of the case 11, and is attached to the front suspension member. The front suspension member is provided on the front side of the vehicle body than the battery pack 4. Front of the case 11 is protected by a connector protective plate on the front side of the electrical device 10.

Figure 3:
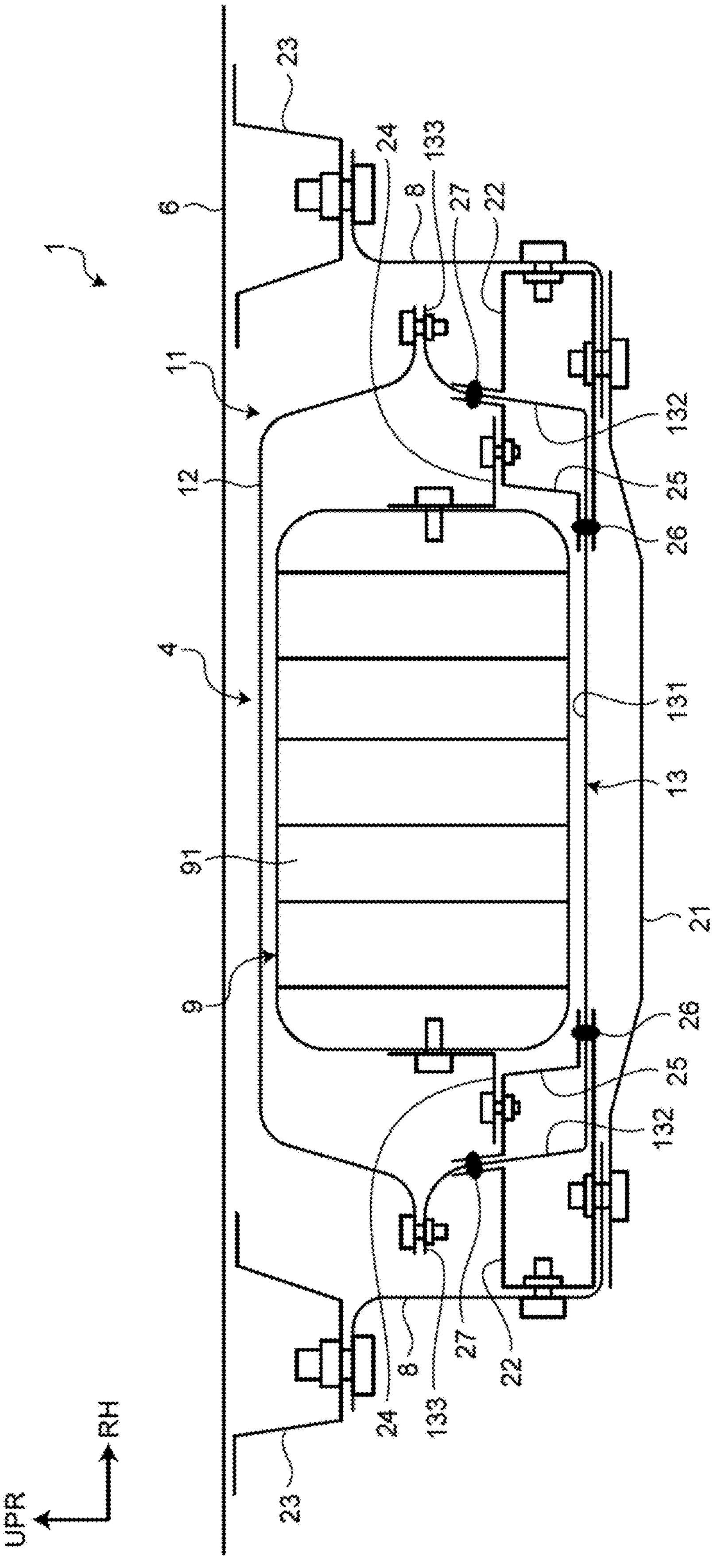
FIG. 3 is a diagram for explaining a structure in which the lower case of the battery pack is fixed to the vehicle body through the bracket.

As illustrated in FIG. 3, the case 11 has an upper cover 12, and a lower case 13. The upper cover 12 and the lower case 13 are integrated by bolt fastening. Lower case 13 houses the battery stack 9 and the electrical equipment 10. The battery stack 9 is housed in the rear portion of the lower case 13, the electric device 10 is housed in the front portion of the lower case 13. Incidentally, in FIG. 3, A-A line cross-section of FIG. 2 is illustrated schematically.

The lower case 13 has a bottom 131, a side wall portion 132, and a flange portion 133. The bottom 131 forms the bottom surface of the lower case 13. The sidewall portion 132 is a wall portion extending from the bottom 131 upward in the vertical direction. The flange portion 133 extends horizontally outward from the upper end of the side wall portion 132.

The hybrid vehicle 1 includes a share panel 21, a reinforcement member (reinforcement linforce) 22, an under member 23, a first inner bracket 24, and a second inner bracket 25.

The share panel 21 is a reinforcing member for reinforcing the lower surface side of the battery pack 4 is a member for protecting the battery stack 9 and the electrical device 10 from the input from the road surface. The share panel 21 is disposed below the bottom 131. The share panel 21 is formed so as to cover the entire bottom 131 is integrated into the lower case 13. The share panel 21 is fixed to the lower case 13 via a reinforcement member 22.

The reinforcement member 22 is a reinforcing member for increasing the rigidity, is provided on the outside of the lower case 13. The reinforcement member 22 is joined to bottom 131 and sidewall portion 132. The reinforcement member 22 and the share panel 21 and the bracket 8 are bolted. The lower portion of the bracket 8 is bolted to the share panel 21 and the reinforcement member 22. The upper portion of the bracket 8 is bolted to the under member 23 of the vehicle body. The under member 23 is provided on the lower surface side of the floor panel 6 extends in the vehicle longitudinal direction. The bracket 8 supports the lower case 13 through the reinforcement member 22. The bracket 8 is an external bracket provided outside the case 11.

The first inner bracket 24 and the second inner bracket 25 is an inner bracket provided inside the case 11. Inside the case 11, the battery stack 9 is supported by the lower case 13 through the first inner bracket 24 and the second inner bracket 25.

The first inner bracket 24 is bolted to the side and the second inner bracket 25 of the battery stack 9. The second inner bracket 25 is bonded to the bottom 131 and the side wall portion 132. On the bottom 131 side, the second inner bracket 25 and the reinforcement member 22 are joined to the bottom 131 by a spot weld 26. On the side wall portion 132 side, the second inner bracket 25 and the reinforcement member 22 are joined to the side wall portion 132 by a weld 27 caused by spot welding.

Figure 4:
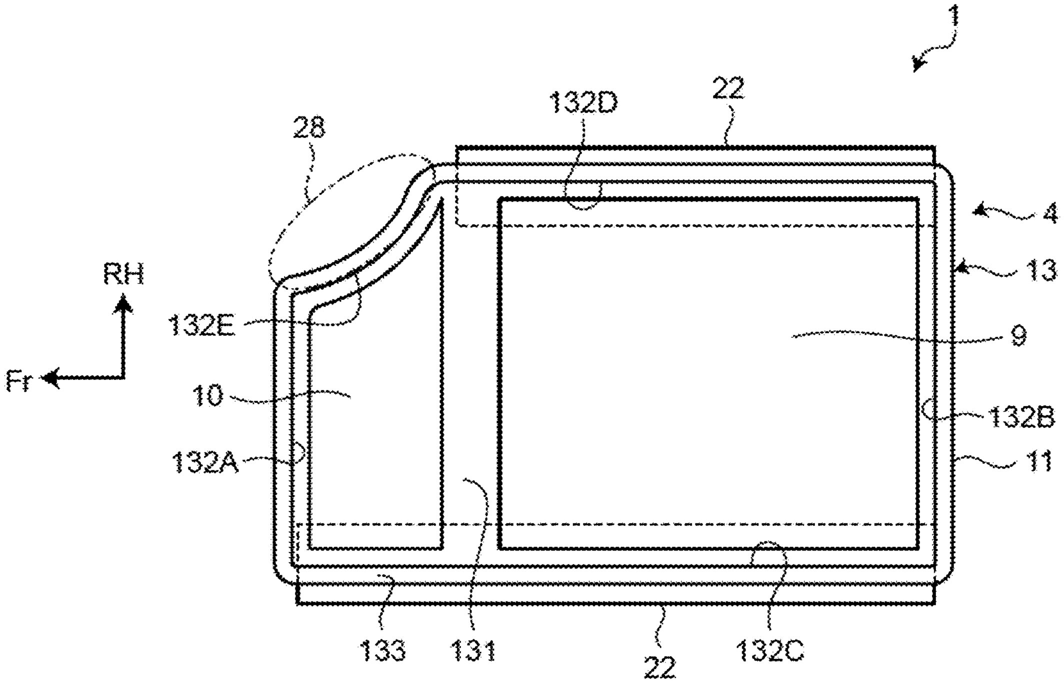
FIG. 4 is a view for explaining a region in which a protective rinse force is provided.

As illustrated in FIG. 4, the side wall portion 132 includes a first wall portion 132A, a second wall portion 132B, a third wall portion 132C, a fourth wall portion 132D, and a fifth wall portion 132E. The first wall portion 132A is a wall portion of the front of the side wall portion 132, facing the electric device 10 in the longitudinal direction. The second wall portion 132B is a wall portion of the rear of the side wall portion 132, facing the cell stack 9 and the longitudinal. When viewed lower case 13 from above, the first wall portion 132A and the second wall portion 132B extends along the vehicle width. The third wall portion 132C is the left wall portion of the side wall portion 132, facing the cell stack 9 and the vehicle widthwise. The fourth wall portion 132D is a right wall portion of the side wall portion 132, facing the cell stack 9 and the vehicle widthwise. When viewed lower case 13 from above, the third wall portion 132C and the fourth wall portion 132D extends along the vehicle longitudinal direction. The fifth wall portion 132E is a wall portion of the front right side of the side wall portion 132, opposite to the electric device 10 in the longitudinal direction, and the electric device 10 and the vehicle widthwise direction. The fifth wall portion 132E is provided on the outside of the electric device 10 in the vehicle widthwise direction and in front of the electric device 10. When viewed lower case 13 from above, the fifth wall portion 132E is a wall portion which is inclined with respect to the longitudinal direction, extending in the vehicle widthwise direction outward with toward the rear side of the vehicle body.

The first wall portion 132A is protected from falling objects from the front by a connector protective plate. The third wall portion 132C and the fourth wall portion 132D is reinforced so that the stiffness is increased by the reinforcement member 22. On the outer peripheral side of the lower case 13, there is a region 28 which is neither the connector protection plate nor reinforcement member 22 is provided. The region 28, as illustrated in FIG. 2, is a region where the bracket 8 is not provided. The area 28 is not provided with reinforcement member 22 and brackets 8. The area 28 is a region where the fifth wall portion 132E of the lower case 13 is disposed in the vicinity of the bent portion 51 of the exhaust pipe 5. The fifth wall portion 132E is a wall portion provided in the area 28 is formed along the bent portion 51. The hybrid vehicle 1, is configured to protect the fifth wall portion 132E with a protective member other than the connector protective plate and the reinforcement member 22.

Figure 5:
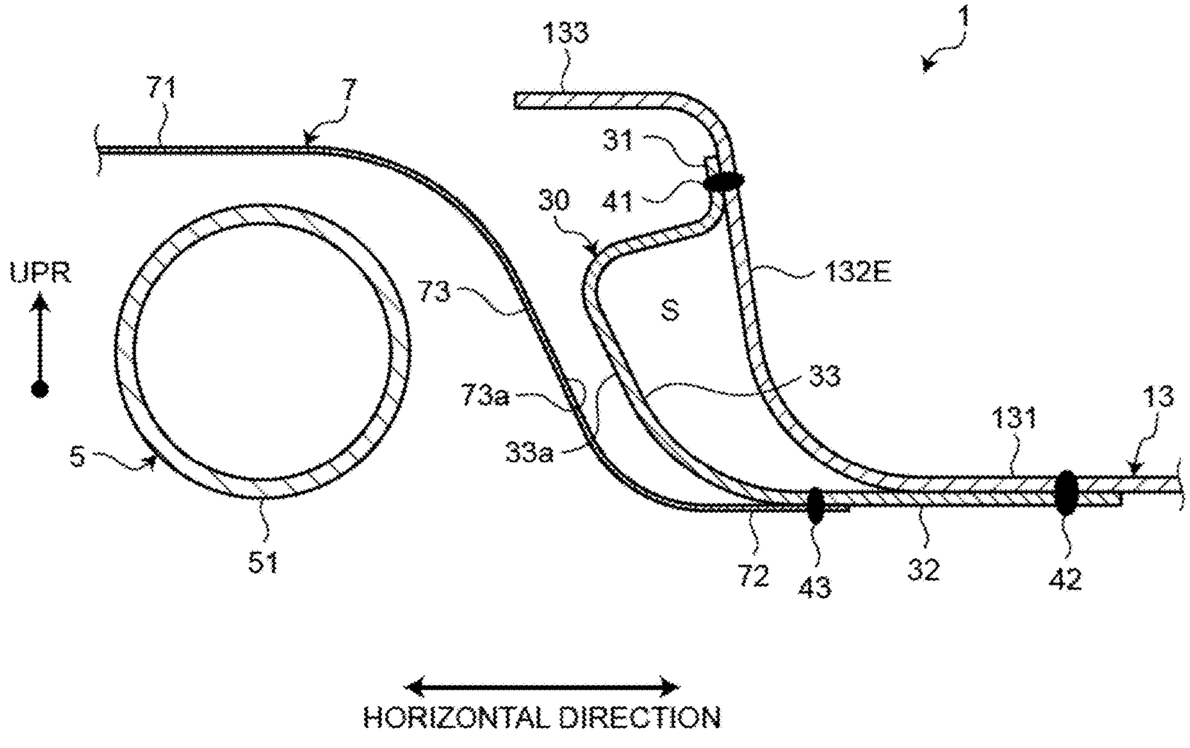
FIG. 5 is a diagram for explaining a protection member provided between the battery pack and the exhaust pipe.

As illustrated in FIG. 5, the hybrid vehicle 1 is provided with a protection member (protection linforce) 30 for protecting the fifth wall portion 132E against a load inputted from the outside. The protection member 30 is a protective member for protecting the battery stack 9 and the electric device 10 in the lower case 13 while protecting the fifth wall portion 132E. Between the fifth wall portion 132E and the bent portion 51, the protection member 30 and the insulator 7 is provided. Incidentally, in FIG. 5, B-B line cross-section of FIG. 2 is illustrated.

The protection member 30 is disposed between the horizontally adjacent bent part 51 and the fifth wall portion 132E. The insulator 7 is formed so as to shield between the exhaust pipe 5 and the lower case 13 is formed in a shape which is inclined with respect to the vertical direction between the bent part 51 and the fifth wall portion 132E. The fifth wall portion 132E is disposed in the vicinity of the bent portion 51 of the exhaust pipe 5 horizontally.

The protection member 30 is joined to the bottom 131 and the fifth wall portion 132E of the lower case 13. The protection member 30 is a metal member.

The protection member 30 has a first portion 31, a second portion 32, and a third portion 33.

The first portion 31 is a portion to be joined to the fifth wall portion 132E. The first portion 31 is disposed below the flange portion 133 is formed in a shape along the fifth wall portion 132E. The first section 31 is joined to the fifth-wall 132E by a spot-welded weld 41.

The second portion 32 is a portion that is bonded to the bottom 131. The second portion 32 is disposed below the fifth wall portion 132E, it is formed in a shape along the bottom 131. The second portion 32 extends along the horizontal direction. The second section 32 is joined to the bottom 131 by a spot weld 42.

The third portion 33 is a portion extending from the first portion 31 to the second portion 32. The third section 33 is disposed below the flanged portion 133, and is formed in a form spaced apart from the fifth wall portion 132E so as to create a space S between the fifth wall portion 132E. The third part 33 has a curved shape which bulges toward the exhaust pipe 5 than the fifth wall portion 132E in the horizontal direction. The third portion 33 is formed such that the horizontal-direction distance between the fifth wall portion 132E is reduced toward the vertical direction downward from the first portion 31 side to the second portion 32 side. The third portion 33 is disposed on the fifth wall portion 132E side than the end of the flange portion 133 in the horizontal direction. The third part 33 includes a parallel portion 33*a* formed in parallel with the insulator 7.

The insulator 7 is provided between the exhaust pipe 5 and the protection member 30. The insulator 7 is composed of a metal. For example, the insulator 7 is a metal thin plate formed by pressing a metal plate. The insulator 7 has an upper portion 71, a lower portion 72, and an inclined portion 73.

The upper portion 71 is a portion covering above the bent portion 51. The upper portion 71 extends horizontally above the bent portion 51. The lower 72 is a portion covering below the fifth wall portion 132E of the lower case 13 and covering below the protection member 30. The lower portion 72 is joined to a protection member 30. The lower portion 72 is joined to second portion 32 by a spot weld 43.

The inclined portion 73 is a portion extending from the upper portion 71 to the lower portion 72. The inclined portion 73 is disposed between the bent portion 51 and the protection member 30 in the horizontal direction. Inclined portion 73 is formed so as to approach the fifth wall portion 132E as directed downward in the vertical direction. Inclination angle with respect to the horizontal is more gradual than the inclination angle of the fifth wall portion 132E of the inclination angle of the inclined portion 73. By the inclination angle of the tipping portion 73 is gentle with respect to the horizontal direction, it is possible to press so that the angle of the connecting portion between the upper portion 71 and the inclined portion 73 is an angle covering the exhaust pipe 5.

Inclined portion 73, as a surface facing the protection member 30, has an inclined surface 73*a* which is inclined with respect to the vertical. The inclined surface 73*a* faces the third part 33 of the protection member 30.

The parallel portion 33*a* of the third part 33 is formed parallel to the inclined surface 73*a* of the inclined portion 73. The third portion 33 is not entirely formed parallel to the inclined portion 73. The third portion 33, at least a portion of the portion facing the inclined surface 73*a* is formed by a parallel-portion 33*a*. Protection member 30 is formed thicker than the insulator 7.

If the projectile or the like from the front to the protection member 30 is in contact, since the third portion 33 is oriented obliquely downward with respect to the vertical direction, it is possible to fly down the projectile after contact with the third portion 33. Thus, it is possible to avoid entering the fifth wall portion 132E from the outside.

The protection member 30, as illustrated in FIG. 4, is formed along the fifth wall portion 132E which is gently inclined with respect to the vehicle longitudinal direction. The protection member 30 is provided on the entire fifth wall portion 132E. When the battery pack 4 is viewed from above, the protection member 30 is gently inclined with respect to the vehicle front-rear direction. Therefore, when the falling objects from the front contacts the protection member 30, the protection member 30 can guide the falling objects or the like to the area reinforcement member 22 of the vehicle width-direction right and rear fourth wall portion 132D is provided. An area on the outer peripheral side of the fourth wall portion 132D where the reinforcement member 22 is provided, together with the stiffness is increased by the reinforcement member 22, the area that can reduce the deformation because the bracket 8 is close to the vehicle body mounting point attached to the under member 23 it is. Thus, to reduce the damage of the lower case 13, it is possible to move the falling object rearward.

As described above, in the embodiment, the fifth wall portion 132E which is gently inclined with respect to the longitudinal direction, the protection member 30 having an inclined surface 73*a* and the equivalent angle of the insulator 7 is provided. By making the parallel-portion 33*a* of the protection member 30 and the inclined portion 73 of the insulator 7 equal to each other, it is possible to guide the falling object from the front and the falling object from the vehicle width direction in the safe direction without affecting the space. Thus, it is possible to avoid impact on the lower case 13. Further, since the bent portion 51 of the exhaust pipe 5 is gently inclined with respect to the horizontal direction, it is possible to avoid the pressure loss of the exhaust pipe 5 is increased.

Incidentally, the reinforcing structure of the lower case 13 is not limited to the share panel 21 may be a structure in which the rear surface reinforcement is provided.

Further, the protection member 30, when constituted by extrusion material to ensure a thickness, may have a structure in which a space in the central portion. The protection member 30, when the die casting, the opposing surface of the parallel-portion 33*a* is formed in a thick.

In the present disclosure, it is possible to suppress the load from the outside is input to the battery cell of the battery pack.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hybrid vehicle comprising:

an internal combustion engine disposed in a front portion of a vehicle body, an electric motor disposed in a front portion of the vehicle body, a battery pack, disposed below a floor panel of the vehicle body, for supplying power to the electric motor, and an exhaust pipe extending from the internal combustion engine to a rear side of the vehicle body and having a bent portion that bends along a side surface of the battery pack in a lower portion of the floor panel, wherein the battery pack includes a battery stack in which a plurality of battery cells are stacked, and an upper cover and a lower case for accommodating the battery stack, the lower case is fixed to the vehicle body through a support member, the hybrid vehicle further comprising a protection member, arranged between the bent portion of the exhaust pipe and a side wall portion of the lower case adjacent in a horizontal direction, for protecting the lower case against a load input from outside, the side wall portion is disposed in a vicinity of the bent portion of the exhaust pipe in the horizontal direction and formed along the bent portion, and, when viewed from above the lower case, and is extending toward outward in a vehicle width direction outward as the side wall portion extends toward the rear side of the vehicle body, the protection member includes a first portion joined to the side wall portion of the lower case, a second portion joined to a bottom of the lower case, and a third portion, extending from the first portion to the second portion, separated from the side wall portion so as to create a space from the side wall portion, and the third portion has a curved shape bulging to a side of the exhaust pipe than a side of the side wall portion in the horizontal direction, and is formed in a manner that a distance from the side wall portion in the horizontal direction becomes smaller as a position of the third portion is downward from the first portion to the second portion in a vertical direction.

2. The hybrid vehicle according to claim 1, wherein the lower case includes a flange portion extending horizontally outward from an upper end of the side wall portion, the first portion is disposed below the flange portion in the vertical direction, and the third portion is disposed on a side of the side wall portion with respect to an end portion of the flange portion in the horizontal direction.

3. The hybrid vehicle according to claim 2, further comprising a heat shield member disposed between the exhaust pipe and the lower case, wherein the heat shield member includes an inclined portion, disposed between the bent portion of the exhaust pipe and the protection member, formed so as to approach the side wall portion as directed downward in the vertical direction, and the third portion includes a parallel portion formed parallel to the inclined portion of the heat shield member.

4. The hybrid vehicle according to claim 3, further comprising a reinforcement member, joined to an outside of the lower case, for increasing a rigidity, wherein the support member is integrated into the lower case through the reinforcement member, and in a region where the bent portion of the exhaust pipe and the side wall portion are disposed close to each other in the lower case, any of the reinforcement member and the support member is not provided.

5. The hybrid vehicle according to claim 4, the battery pack includes an electrical device, which is housed in a front portion side of the battery stack on the lower case and is electrically connected to the battery stack, and the side wall portion is provided outside of the electric device in the vehicle width direction and on a front side of the electric device.

* * * * *